United States Patent [19]
Tsukamoto et al.

[11] Patent Number: 5,788,600
[45] Date of Patent: Aug. 4, 1998

[54] CONTINUOUSLY VARIABLE TRANSMISSION

[75] Inventors: Kazumasa Tsukamoto, Toyota; Takeshi Inuzuka; Masashi Hattori, both of Anjo, all of Japan

[73] Assignee: Aisin AW Co., Ltd., Japan

[21] Appl. No.: 766,801

[22] Filed: Dec. 13, 1996

[30] Foreign Application Priority Data

Dec. 15, 1995 [JP] Japan ................ 7-327663
Dec. 15, 1995 [JP] Japan ................ 7-327664

[51] Int. Cl.⁶ ............................................. F16H 9/26
[52] U.S. Cl. ................................. 477/45; 477/48
[58] Field of Search .......................... 477/43, 45, 47, 477/48; 701/52, 53

[56] References Cited

U.S. PATENT DOCUMENTS

| | | | |
|---|---|---|---|
| 4,644,820 | 2/1987 | Macey et al. | 477/46 |
| 5,257,188 | 10/1993 | Sakakibara et al. | 701/53 |
| 5,662,547 | 9/1997 | Moroto et al. | 477/48 |
| 5,669,846 | 9/1997 | Moroto et al. | 477/45 X |

FOREIGN PATENT DOCUMENTS

| | | |
|---|---|---|
| 6101754 | 4/1994 | Japan . |
| 6331000 | 11/1994 | Japan . |
| 7133858 | 5/1995 | Japan . |
| 7139608 | 5/1995 | Japan . |

*Primary Examiner*—Khoi Q. Ta
*Attorney, Agent, or Firm*—Lorusso & Loud

[57] ABSTRACT

In a CVT transmission with planetary gear operation in forward, zero and reverse directions, reduction in CVT secondary/primary pulley ratio is inhibited when the pulley ratio is less than a set pulley ratio which is higher than the pulley ratio producing zero output rotation (a gear-neutral state). In a ratio region below the set pulley ratio, a movable sheave of a primary pulley is moved to an O/D side. The amount of the movement is detected by a sensor shoe (detecting means) which is associated with the movable sheave. A ratio sensing valve (inhibition means) associated with the sensor shoe, in turn, clogs a port, halting a hydraulic pressure supplied by a primary regulator valve. As a result, no hydraulic pressure is supplied to the second hydraulic chamber by way of a down-shift relief valve, a manual valve or a low-high control valve, inhibiting a down shift.

8 Claims, 9 Drawing Sheets

Clutch-Engagement Table

| Range | Clutch | $C_L$ | $C_H$ |
|---|---|---|---|
| P | | | |
| R | | ○ | |
| N | | | |
| D | Low | ○ | |
| D | High | | ○ |

H Mode

| D | | Narrowing Pressure | | |
|---|---|---|---|---|
| | | Pri>Sec | Pri=Sec | Pri<Sec |
| PWR ON | Up | ○ | | |
| | Down | ○ | (○) | |
| PWR OFF | Up | | (○) | |
| | Down | | | ○ |

FIG. 9A

L Mode

| | | Narrowing Pressure | | |
|---|---|---|---|---|
| | | Pri>Sec | Pri=Sec | Pri<Sec |
| D | PWR ON Up | ○ | | |
| | PWR ON Down | | | ○ |
| | PWR OFF Up | ○ | (○) | |
| | PWR OFF Down | ○ | (○) | ○ |
| Gear Neutral | | ○ | | |
| R | PWR ON Up | ○ | (○) | ○ |
| | PWR ON Down | ○ | (○) | |
| | PWR OFF Up | | | |
| | PWR OFF Down | | | ○ |

※ N, P  $C_H$ and $C_L$ are Disengaged
Pri = Sec

Combinations Avoided to Guarantee Forward/Backward Drive States

5,788,600

CONTINUOUSLY VARIABLE TRANSMISSION

BACKGROUND OF THE INVENTION

1. Field of the Invention

The invention relates to a belt-type continuously variable transmission apparatus which has primary and secondary variable sheath pulleys with a V-belt around the primary and secondary pulleys, and more specifically to such a continuously variable transmission with a planetary gear and start control suitable for motor vehicle use.

2. Description of the Prior Art

In recent years, a belt-type continuously variable transmission combined with a planetary gear arrangement has been proposed to further improve fuel efficiency and driving performance of a vehicle. Such a continuously variable transmission is disclosed for example, in U.S. Pat. No. 4,644,820.

Such a belt-type continuously variable transmission apparatus has primary and secondary pulleys each formed by two sheaves, that is, a fixed sheave and a movable sheave, and a V-belt extending around the primary and secondary pulleys. A secondary/primary pulley ratio is changed by changing the relative widths of the pulleys, i.e., by changing the relative narrowing pressures on the movable sheaves controlling the relative diameters of belt travel on the respective pulleys. More specifically, the secondary/primary pulley ratio is decreased when the narrowing pressure on the movable sheath of the primary pulley is raised, and the secondary/primary pulley ratio is increased when the narrowing pressure on the movable sheath of the secondary pulley is raised. The relative rotational velocities of a sun gear and a carrier of a planetary gear, connected to the respective secondary and primary pulleys, can be adjusted by adjusting the pulley ratio to control rotation of a ring gear connected to an output shaft in a normal forward direction, stopped, or in a reverse direction in order to establish a forward drive state, a neutral state or a reverse drive state respectively.

To move a vehicle forward, the power is turned on, a select lever is put in a drive (D) range and the rotational speed of an input shaft is increased while the narrowing pressure on the movable sheath of the secondary pulley is raised in order to increase the secondary/primary pulley ratio and drive the ring gear in the forward direction. In this way, an up shift operation of the CVT is carried out. When the vehicle is to move in a reverse direction on the other hand, the power is turned on, the select lever is put in a reverse (R) range, and the rotational speed of the input shaft is increased while the narrowing pressure on the movable sheath of the primary pulley is raised in order to decrease the secondary/primary pulley ratio (down shift of CVT) to drive the ring gear in the reverse direction. Thus when a vehicle begins movement in either the forward or backward direction, the vehicle transmission transits from its neutral state to a forward or backward drive state.

However in the continuously variable transmission described above, whether the vehicle starts to move forward or backward from a neutral state is completely dependent upon whether the secondary/primary pulley ratio is increased or decreased, that is, whether the narrowing pressure on the movable sheath of the secondary or primary pulley is raised relative to the other pulley. As a result, if control is carried out by mistake to decrease the secondary/ primary pulley ratio due to computer malfunction or the like when the vehicle is supposed to move forward, it actually moves backward against the driver's will. On the other hand, if control is carried out by mistake to increase the secondary/ primary pulley ratio when the vehicle is supposed to move backward, it actually moves forward.

SUMMARY OF THE INVENTION

It is thus an object of the invention to provide a continuously variable transmission that ensures movement of a vehicle in the selected forward or backward direction with a high degree of reliability when the vehicle starts to move from a neutral state.

To solve the problems described above, according to the invention, there is provided a continuously variable transmission comprising: an input shaft associated with an engine output shaft; an output shaft associated with vehicle wheels; a belt-type continuously variable transmission apparatus comprising a first pulley associated with the input shaft, a second pulley provided on the output shaft, a belt wound around the first and second pulleys and axial force applying means for applying axial forces to the first and second pulleys in order to change a pulley ratio; a planetary gear comprising a first rotary element associated with the input shaft, a second rotary element associated with the second pulley and a third rotary element associated with the output shaft; pulley-ratio detecting means for detecting the pulley ratio of the belt-type continuously variable transmission apparatus; and control means for controlling the axial forces applied to the first and second pulleys by the axial force applying means so that the axial forces applied to the first and second pulleys are different from each other by an amount corresponding to a target pulley ratio. A direction in which torque is transmitted between the first and second pulleys via the planetary gear is changed and a forward drive state, a neutral state and a backward drive state of a vehicle can be set in accordance with a change in the pulley ratio. The control means comprises: axial force reversing means for reversing a relation in magnitude between the axial forces applied to the first and second pulleys in accordance with a change in the direction in which torque is transmitted between the first and second pulleys; and inhibition means for inhibiting reversal of the relation in magnitude between the axial forces applied to the first and second pulleys performed by the axial force reversing means when a pulley ratio detected by the pulley-ratio detecting means is within a predetermined pulley-ratio range including a pulley ratio for achieving the neutral state.

According to a second aspect of the invention, the axial force applying means comprises: a first hydraulic servo having a first hydraulic chamber and a second hydraulic chamber for applying an axial force to the first pulley; and a second hydraulic servo having a first hydraulic chamber and a second hydraulic chamber for applying an axial force to the second pulley. The control means supplies equal hydraulic pressures to the first hydraulic chambers of the first and second hydraulic servos and selectively supplies a hydraulic pressure to either of the second hydraulic chambers of the first or second hydraulic servo by means of the axial force reversing means. Furthermore the control means prevents the hydraulic pressure from being supplied to either of the second hydraulic chambers by the axial force reversing means by means of the inhibition means when a pulley ratio detected by the pulley-ratio detecting means is within a predetermined pulley-ratio range.

According to a third aspect of the invention, the axial force reversing means comprises a ratio control valve for controlling one of hydraulic pressures supplied to the second hydraulic chambers of the first and second hydraulic servos and a down-shift valve for controlling the other of the hydraulic pressures supplied to the second hydraulic chambers of the first and second hydraulic servos. The inhibition means has a control valve, which is provided on the upstream side of the down-shift valve, to prevent a hydraulic pressure from being supplied to the down-shift valve.

According to a fourth aspect of the invention, the continuously variable transmission comprises a first clutch for selectively engaging said input shaft with said first rotary element; a second clutch for selectively engaging any two of said three rotary elements of said planetary gear with each other; mode switching means for switching operation between a low mode in which a large torque is generated by engaging said first clutch and disengaging said second clutch and a high mode in which a small torque is generated by engaging said second clutch and disengaging said first clutch; and an auxiliary hydraulic path for supplying a hydraulic pressure of said second clutch to said down-shift valve without using said control valve when said high mode is selected by said mode switching means.

According to a fifth aspect of the invention, the first pulley has a first movable sheave driven with a hydraulic pressure supplied to the first hydraulic servo; the second pulley has a second movable sheave driven with a hydraulic pressure supplied to the second hydraulic servo; the pulley-ratio detecting means has a position detecting member which accompanies one of the first and second movable sheaves to detect the position of said one of the first and second movable sheaves; and the inhibition means is coupled to the position detecting member.

According to a sixth aspect of the invention, the predetermined pulley-ratio range is set in the vicinity of a pulley ratio for achieving the neutral state and a pulley-ratio range for achieving the forward drive state as well as a pulley-ratio range for achieving a backward drive state.

According to a seventh aspect of the invention, the inhibition means inhibits reversal of the relation in magnitude between the axial forces applied to the first and second pulleys performed by the axial force reversing means to prevent a power-off down-shift when a pulley ratio detected by the pulley-ratio detecting means is within the predetermined pulley-ratio range.

According to an eighth of the invention, the first, second and third rotary elements of the planetary gear are a carrier, a sun gear and a ring gear respectively.

In the structure described above, the axial force reversing means reverses a relation in magnitude between axial forces applied to the first and second pulleys in accordance with a change in torque transmission direction between the first and second pulleys. Then, the inhibition means inhibits reversal of the relation in magnitude between the axial forces applied to the first and second pulleys carried out by the axial force reversing means when a pulley ratio detected by the pulley-ratio detecting means is in a predetermined pulley-ratio range including a pulley ratio implementing the neutral state. As a result, since the relation in magnitude between the axial forces is changed so that the axial force on the driving side is greater than the axial force on the driven side in accordance with a change in torque transmission direction in an area outside the predetermined pulley-ratio range, it is possible to implement all kinds of shift such as the power-on up and down shifts and the power-off up and down shifts. In the predetermined pulley-ratio range, however, only certain shifts can be implemented because the reversal of the relation in magnitude between the axial forces is regulated.

In addition, the predetermined pulley-ratio range is set in the vicinity of a pulley ratio implementing the neutral state and a pulley-ratio range implementing the forward drive state as well as a pulley-ratio range implementing a backward drive state. Furthermore, the inhibition means inhibits the reversal of the relation in magnitude between the axial forces so as to inhibit a power-off down shift.

The invention will become apparent from the following detailed description of the preferred embodiments with reference to accompanying diagrams showing the embodiments.

BRIEF DESCRIPTION OF THE DRAWINGS

The foregoing and further objects, features and advantages of the invention will become apparent from the following description of preferred embodiments with reference to the accompanying drawings, wherein:

FIG. 5 is a table showing engagement operations of a low clutch and a high clutch in a variety of ranges;

FIGS. 9a and 9b are tables showing narrowing pressures on moveable sheaves of primary and secondary pulleys for low and high modes, respectively.

DETAILED DESCRIPTION OF THE PREFERRED EMBODIMENTS

Figure 1:
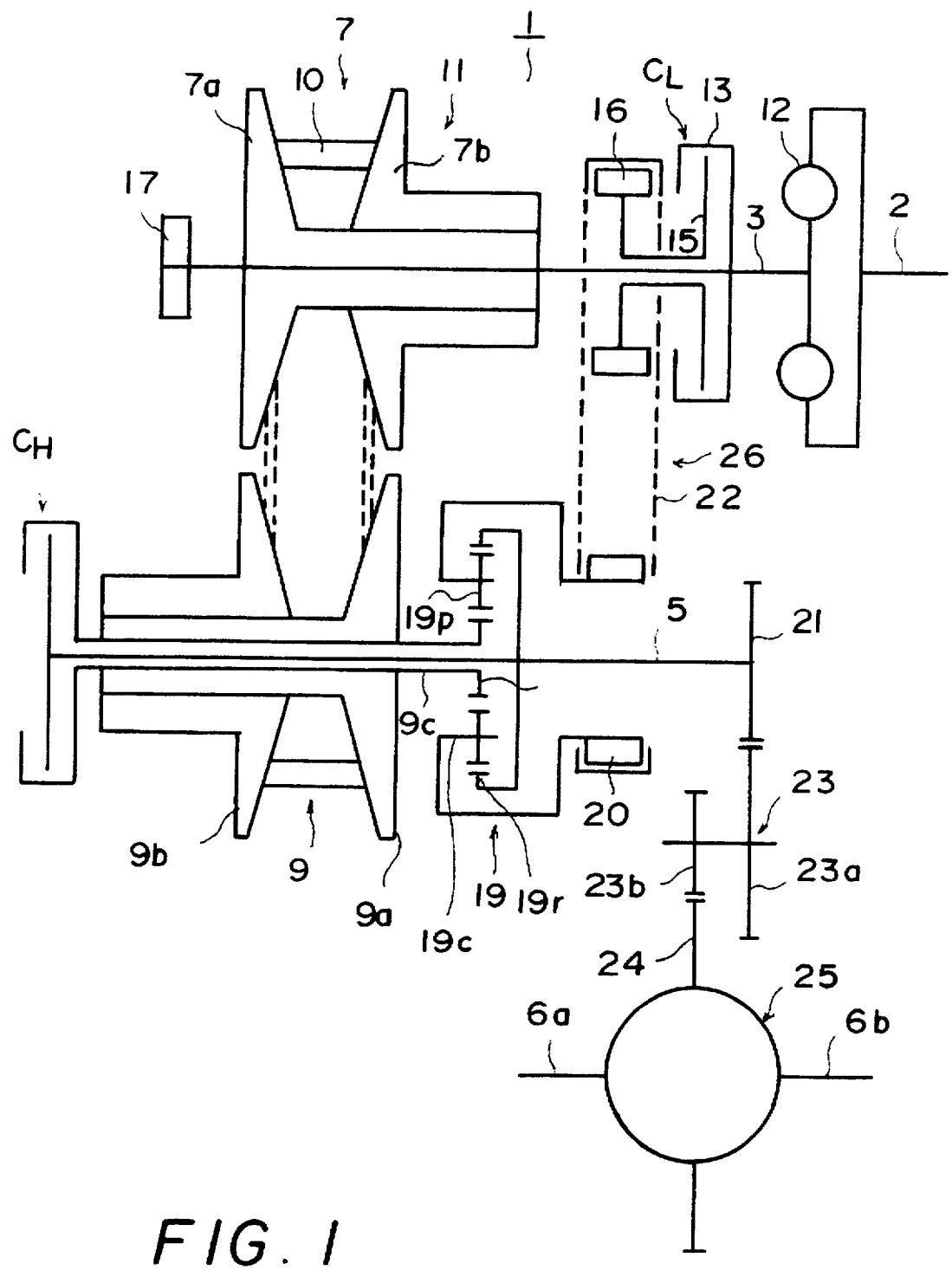
FIG. 1 is a skeleton diagram showing a power transmitting apparatus of a continuously variable transmission in accordance with an embodiment of the invention.

A power transmitting mechanism 1 of a continuously variable transmission in accordance with the invention, as illustrated in FIG. 1, includes a first shaft 3 linked to an engine crank shaft 2, a second shaft 5 and right and left third acceleration shafts 6a and 6b linked to the vehicle front wheels. The first shaft 3 supports a primary (first) pulley 7 while the second shaft 5 supports a secondary (second) pulley 9. A V-belt 10 extends around the primary pulley 7 and the secondary pulley 9 to form a belt-type continuously variable transmission apparatus 11.

The first shaft 3 is linked to the engine crank shaft 2 by a damper 12. An input-side member 13 of a low range clutch $C_L$ is fixed on the first shaft 3 while an output-side member 15 of the clutch $C_L$ is rotatably supported by the first shaft 3. A primary-side sprocket 16 forming a power transmitting means is linked integrally to the output-side member 15. In addition, a fixed sheave 7a of the primary pulley 7 is fixed to the first shaft 3 and an oil pump 17 is attached to the end of the first shaft 3. A movable sheave 7b of the primary pulley 7 is supported by the fixed sheave 7a movably in the shaft or axial direction.

The secondary pulley 9 is rotatably supported by the second or output shaft 5. The secondary pulley 9 comprises a fixed sheave 9a, a movable sheave 9b supported by the fixed sheave 9a movably in the shaft direction and a secondary shaft 9c integrally linked to the fixed sheave 9a. In addition, a high clutch $C_H$ is provided between the second shaft 5 and the secondary shaft 9c. A planetary gear arrangement 19 is connected the shafts 5 and 9c and has a secondary-side sprocket 20 coupled by a member 22 to the sprocket 16. An output gear 21 is fixed on one end of the second shaft 5 to form an output of the transmitting apparatus.

The planetary gear arrangement 19 includes a sun gear 19s, a ring gear 19r, and a carrier 19c rotatably supporting one or more pinions 19p engaged with both the sun and ring gears 19s and 19r. The carrier 19c is fixed to the secondary-side sprocket 20 and serves as a first rotary element. The sun gear 19s is fixed to the secondary shaft 9c and serves as a second rotary element while the ring gear 19r is fixed to the second shaft 5 and serves as a third rotary element. The coupling member 22 can be a silent chain, a roller chain or a timing belt extending around the primary-side and secondary-side sprockets 16 and 20.

In addition, the gear 21 fixed on the second shaft 5 is engaged with a large gear 23a of a speed reducing gear unit 23 while a small gear 23b of the speed reducing gear unit 23 is engaged with a ring gear 24 of a differential apparatus 25. The differential apparatus 25 transmits rotation to the left and right acceleration shafts 6a and 6b which form a third shaft; the differential 25 permits different rotative speeds of the shafts 6a and 6b.

In operation of the power transmitting mechanism 1 of the continuously variable transmission, referring to FIGS. 1 and 5, the rotation of the engine crank shaft 2 is transmitted to the first shaft 3 by way of the damper 12. In the low (L) mode in which the low clutch $C_L$ is engaged while the high clutch $C_H$ is disengaged, the rotation of the first shaft 3 is transmitted to the primary pulley 7 and also transmitted to the carrier 19c of the planetary gear 19 by way of a power transmitting apparatus 26 including the primary-side sprocket 16, the coupling member 22 and the secondary-side sprocket 20. The rotational speed of the secondary pulley 9 relative to the primary pulley 7 can be continuously varied by adjusting the pulley ratio of the secondary pulley 9 to the primary pulley 7 (secondary/primary ratio=radius of belt 10 on the pulley 9 divided by radius of belt 10 on the pulley 7) by means of axial force applying means such as a hydraulic servos controlling the axial positions of moveable sheaves 9b and 7b. The sun gear 19s of the planetary gear 19 is also rotated at the variable speed of the secondary pulley 9.

In the low mode, the ring gear 19r of planetary gear 19 is is driven by the pinions 19p on the carrier 19c which is rotated at a constant speed transmitted by way of the power transmitting apparatus 26. The pinions 19p are reactive to the continuously variable speed rotation of the sun gear 19s by the belt-type continuous variable transmission apparatus (CVT) 11. The sun gear 19s and the carrier 19c rotate in the same direction but rotation of the ring gear 19r and second or output shaft 5 is also controlled by the reaction of the pinions 19p to a difference in rotational speeds of the sun gear 19s and the carrier 19c. Thus as the rotational speed of the sun gear 19s is varied to speeds increasingly greater than the rotational speed of the carrier 19c, the reaction of the pinions 19p results in the rotation of the ring gear 19r and shaft 5 in the forward direction becoming zero and then reversing in direction. Because of the reactive rotary elements driving the second shaft 5, the planetary gear 19 also creates a variable torque environment. That is to say, in both the normal and reverse directions (forward and backward directions) of rotation of the second shaft 5 at rotative speeds less than the rotative speed of the input shaft 3, the output torque of second shaft is increased.

In the high (H) mode in which the low clutch $C_L$ is disengaged while the high clutch $C_H$ is engaged, the transmission of power to the planetary gear 19 by way of the power transmitting apparatus 26 is cut off. In this mode, the engagement of the high clutch $C_H$ connects the sun gear 19s to the ring gear 19r to place the planetary gear 19 in an integrally rotating state. As a result, the rotation of the first shaft 3 is transmitted to the second shaft 5 by way of the belt-type continuously variable transmission apparatus (CVT) 11 and the high clutch $C_H$. That is to say, power is transmitted from the primary pulley 7 to the secondary pulley 9 by the belt 10 in the CVT 11. The rotation of the second shaft 5 is transmitted to the differential apparatus 25 by way of the output gear 21 and the speed reducing gear unit 23 and then to the right and left front wheels by way of the right and left drive wheel shafts 6a and 6b respectively.

Figure 2:
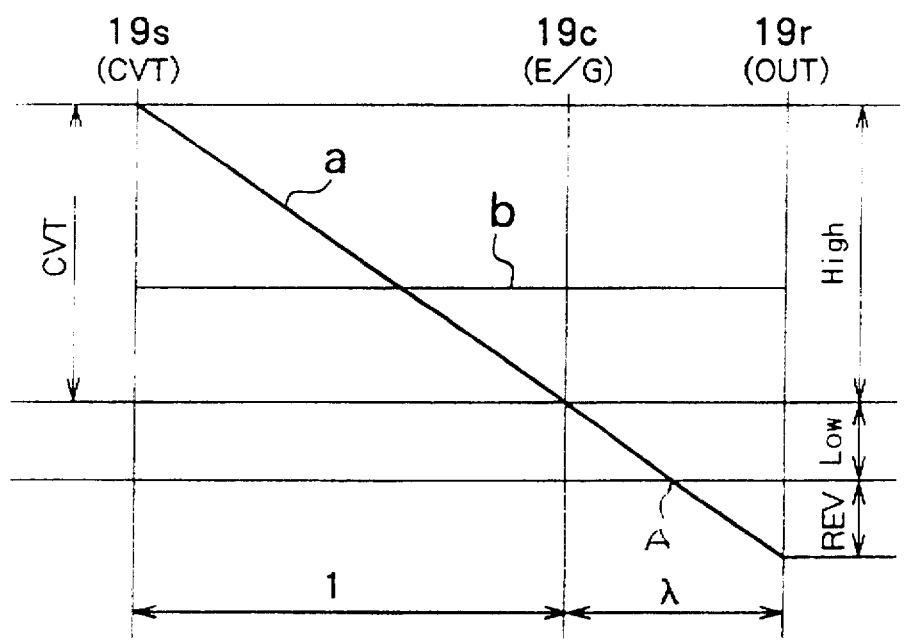
FIG. 2 is a speed diagram of the power transmitting apparatus of FIG. 1.

In the speed diagram of FIG. 2, line (a) represents the output speed of the transmission relative to its input speed with the highest forward speed at the upper left. The forward speed decreases down and right from the highest speed to point A where the speed becomes zero. Continuing down and right from point A, the speed reverses and increases in the backward or reverse direction. In the high mode represented by "1", "CVT" and "High", the relative output speed of the transmission is set solely by the CVT ratio, i.e., the secondary/primary pulley ratio. Within this high mode, the horizontal line (b) represents a CVT ratio of 1. Within the λ region, speed is a function of a ratio of the sun gear tooth count Zs to the ring gear tooth count Zr (that is, Zs/Zr) in addition to the CVT ratio.

Figure 3:
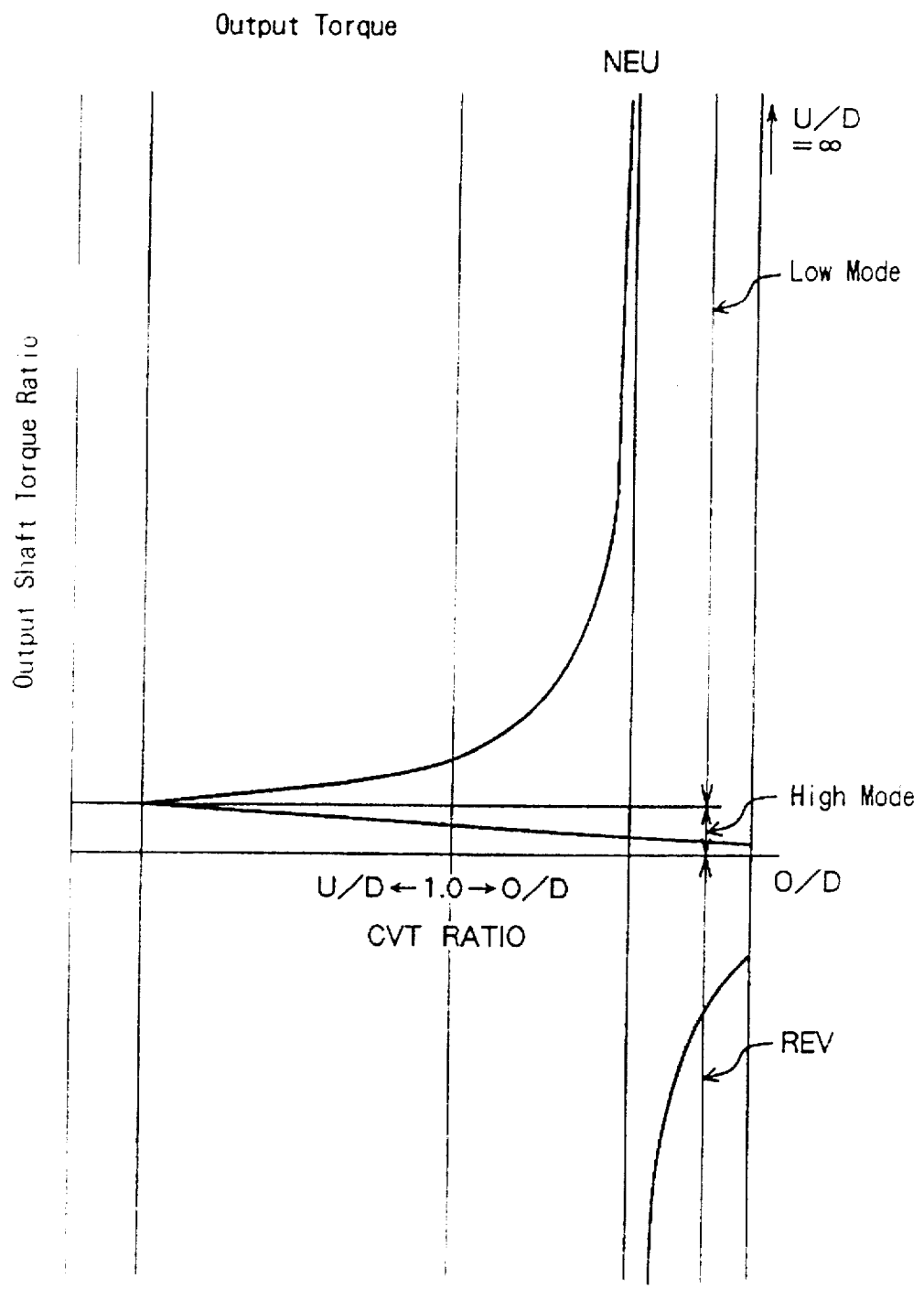
FIG. 3 is a diagram showing a relationship between the output torque and the pulley ratio of a belt-type continuously variable transmission apparatus (CVT) employed in the power transmitting apparatus of FIG. 1.

In the output torque diagram of FIG. 3, the torque produced by the second shaft 5, while the clutch $C_L$ is engaged and the clutch $C_H$ is disengaged, increases to an infinite value in a region in close proximity to the neutral (NEU) position. In the low region as the CVT ratio increases (CVT up shift–U/D direction) from the NEU ratio, the output torque decreases. In the REV region as the CVT ratio decreases (CVT down shift) from the NEU ratio, the output torque likewise decreases. In the high mode as the CVT 11 makes a down shift in the overdrive direction (the O/D direction), the rotational speed of the second shaft 5 increases relative to the input, reducing the transmitted torque by an amount corresponding to the increase in rotational speed.

Figure 4:
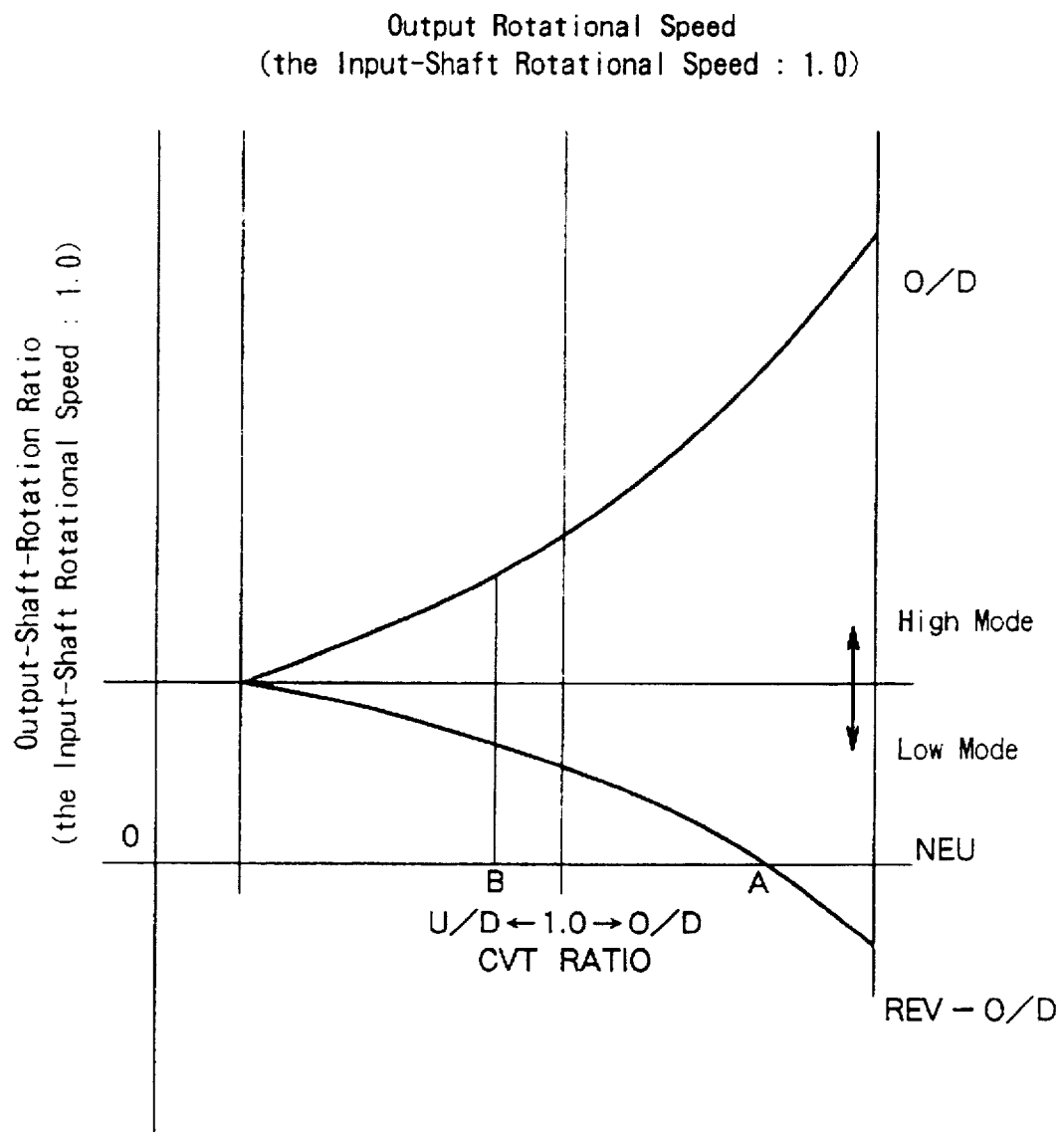
FIG. 4 is a diagram showing a relationship between the output rotational speed and the pulley ratio of the CVT employed in the power transmitting apparatus of FIG. 1.

In the output rotational speed diagram of FIG. 4 while in the low mode when the CVT 11 is at the limit (the O/D end) of the O/D (overdrive) direction due to the sun gear 19s rotating at a maximum speed relative to the input speed, the rotation of the ring gear 19r is reversed into a reverse (REV) rotation relative to the rotation of the carrier 19c which is rotating at a constant speed and the reverse (REV) rotation is transmitted to the second shaft 5. As the CVT 11 makes an up shift in the U/D (underdrive) direction, the rotational speed in the reverse direction decreases, arriving at a neutral position (NEU) at which the rotational speed of the second shaft 5 is reduced to a zero at a predetermined pulley ratio determined by the gear ratios of the planetary gear 19 and the power transmitting apparatus 26. As the CVT 11 continues the shift to the U/D (underdrive) direction, the rotation of the ring gear 19r increases in the normal or forward direction and this rotation in the normal direction is transmitted to the second shaft 5. When the CVT 11 is at the limit (the U/D end) of the U/D (underdrive) direction, the low clutch CL is disengaged, the high clutch $C_H$ is engaged and an operation to switch to the high mode is carried out. Speed of the output shaft 5 relative to the input then increases in response to down shift of the CVT (in the O/D direction).

Next, a hydraulic control mechanism of the continuously variable transmission provided by an embodiment of the invention is explained.

Figures 6A, 6B:
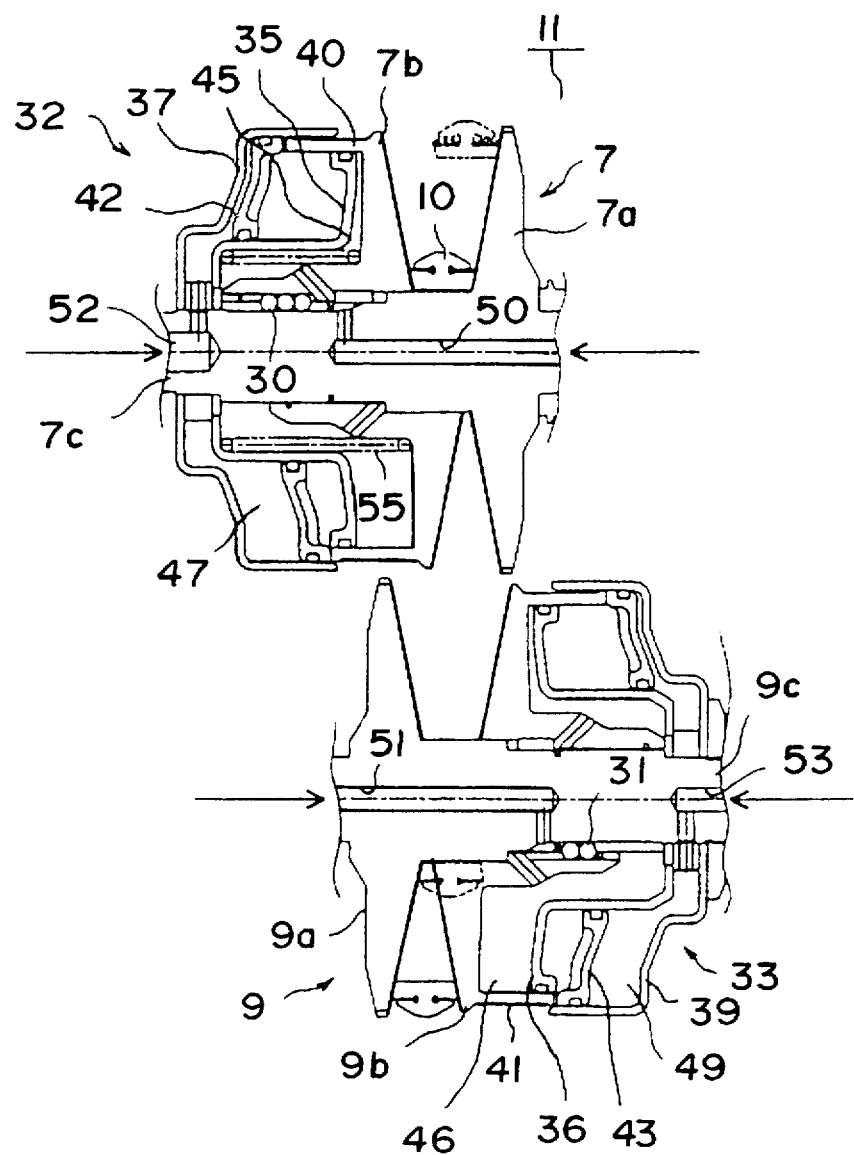
FIGS. 6a and 6b are diagrams showing cross sections of double-chamber-type hydraulic servos which apply axial forces to a primary pulley and to a secondary pulley respectively in the transmitting apparatus of FIG. 1.

As shown in FIG. 6, the movable sheave 7b of the primary pulley 7 is supported movably in the shaft direction on a boss 7c of the fixed sheave 7a of the primary pulley 7 by a ball spline 30. By the same token, the movable sheave 9b of the secondary pulley 9 is supported movably in the shaft direction on a boss 9c of the fixed sheave 9a of the secondary pulley 9 by a ball spline 31. On the back surface of the movable sheave 7b, a primary-side hydraulic servo 32 serving as axial force applying means for applying an axial force to the primary pulley 7 is provided. Similarly, on the back surface of the movable sheave 9b, a secondary-side hydraulic servo 33 serving as an axial force applying means for applying an axial force to the secondary pulley 9 is provided. The primary-side hydraulic servo 32 comprises a partition member 35 fixed to the fixed sheave 7c, a cylinder member 37, a drum member 40 fixed to the back surface of the movable sheave 7b and a second piston member 42. Likewise, the secondary-side hydraulic servo 33 comprises a partition member 36 fixed to the fixed sheave 9c, a cylinder member 39, a drum member 41 fixed to the back surface of the movable sheave 9b and a second piston member 43. The partition member 35 is fitted to the drum member 40 in a hydraulic-sealed state and also fitted to the second piston member 42, the cylinder member 37 and the partition member 35 to form a double piston structure comprising a first hydraulic chamber 45 and a second hydraulic chamber 47. By the same token, the partition member 36 is fitted to the drum member 41 in a hydraulically sealed state and also fitted to the second piston member 43, the cylinder member 39 and the partition member 36 to form a double piston structure comprising a first hydraulic chamber 46 and a second hydraulic chamber 49.

In addition, in the first hydraulic chamber 45 of the primary-side hydraulic servo 32, the back surface of the movable sheave 7b forms a piston surface on the primary side. Similarly, in the first hydraulic chamber 46 of the secondary-side hydraulic servo 33, the back surface of the movable sheave 9b forms a piston surface on the secondary side. An effective pressure receiving area on the piston surface on the primary side is equal to an effective pressure receiving area on the secondary side. In addition, hydraulic paths 50 and 52 connected to the first and second hydraulic chambers 45 and 47 are formed on the boss 7c of fixed sheave 7b on the primary side. By the same token, hydraulic paths 51 and 53 connected to the first and second hydraulic chambers 46 and 49 are formed on the boss 9c of the fixed sheave 9b on the secondary side. In addition, a spring 55 for pre-loading use is provided in a contracted state in the first hydraulic chamber 45 of the primary-side hydraulic servo 32.

Figure 7:
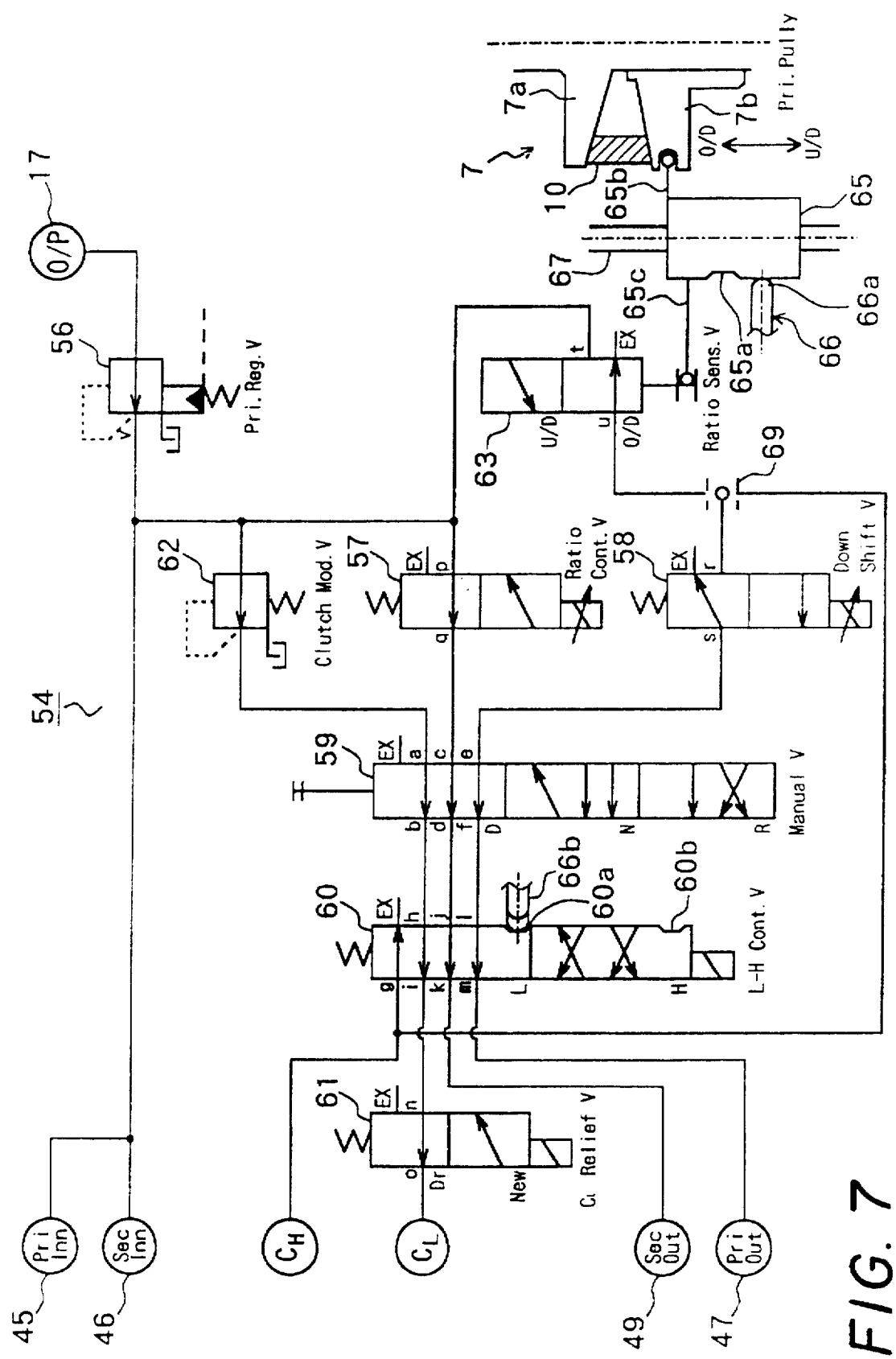
FIG. 7 is a diagram showing a hydraulic circuit of a hydraulic control mechanism for the transmitting apparatus of FIG. 1.
Figure 8:
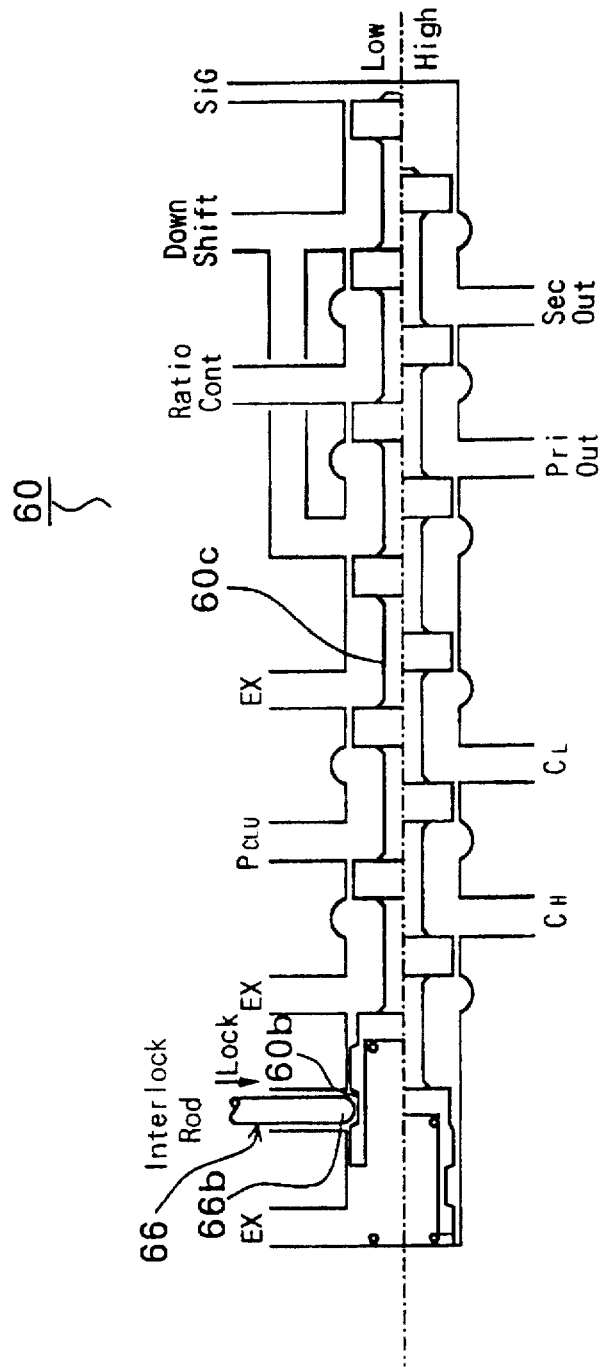
FIG. 8 is a diagram showing the structure of a low-high control valve and an interlock rod of the hydraulic ciruit of FIG. 7.

In addition, as shown in FIG. 7, a hydraulic control mechanism (means) 54 employed in the present embodiment comprises a primary regulator valve 56, a ratio control valve (axial force reversing means) 57, a down-shift relief valve (axial force reversing means) 58, a manual valve 59, a low-high control valve (or a low-high switching valve) 60 serving as a low-high switching means, a low clutch relief valve 61 and a clutch modulation valve 62. For details of the low-high control valve 60, refer to FIG. 8. Furthermore, the hydraulic control mechanism (means) 54 also includes a ratio sensing valve (inhibition means) 63, a sensor shoe (a movable member) 65 used as a position-detecting member (pulley-ratio detecting means) and an interlock rod (lock means) 66.

The sensor shoe 65 is supported slidably by a guide member 67 installed in parallel to the axis of the primary pulley 7. Two linkage portions 65b and 65c protrude from the sensor shoe 65. The linkage portion 65b is engaged with the movable sheave 7b of the primary pulley 7 while the linkage portion 65c is engaged with the ratio sensing valve 63 described above. With this arrangement, therefore, when the movable sheave 7b moves along the shaft in the O/D or U/D direction, the distance by which the movable sheave 7b moves is transmitted to the ratio sensing valve 63 as it is by way of the sensor shoe 65.

Furthermore, a detent 65a is formed on the sensor shoe 65. A base end 66a, one end of the interlock rod 66, is engaged with and disengaged from the detent 65a. The interlock rod 66 is installed so as to pass through a valve body. The other end 66b of the interlock rod 66 is engaged with and disengaged from detents 60a and 60b of the low-high control valve 60. FIG. 7 shows the interlock rod 66 which is split into the base end 66a and the other end 66b. It should be noted, however, that in actuality, the interlock rod 66 is a single rod. In addition, when the base end 66a of the interlock rod 66 is engaged with the detent 65a of the sensor shoe 65, the other end 66b is engaged with neither the detent 60a nor the detent 60b of the low-high control valve 60. Instead, the other end 66b is brought into contact with the surface of the low-high control valve 60. When the base end 66a of the interlock rod 66 is disengaged from the detent 65a of the sensor shoe 65 and brought into contact with a protrusion on the surface of the sensor shoe 65, on the contrary, the other end 66b is engaged with either the detent 60a or the detent 60b of the low-high control valve 60.

Next, the operation of the hydraulic control mechanism 54 with the structure described above is explained by referring to FIG. 7.

Operations in the following modes and ranges will be explained in the order they are listed as follows:

(1) D range L mode (Low mode of drive range)
(2) D range H mode (High mode of drive range)
(3) R range (Reverse range)
(4) N and P ranges (Neutral and parking ranges)

A first pulley ratio A shown in FIG. 4 is a pulley ratio in a neutral state and a second pulley ratio B is greater than the first pulley ratio A. A vertical line passing through the second pulley ratio B is the border between a region with high pulley ratios on the left side of the figure and a region with low pulley ratios on the right side of the figure. The low and high modes of the drive ranges (1) and (2) are set by having different controls in the regions on the left and right sides of the second pulley ratio B. Because of these different controls, as will be described later, a down shift of the CVT ratio is inhibited in the low mode of the drive range and in the reverse range in the region of CVT ratios below the second pulley ratio B. Also in the region below the second pulley ratio B, a jump from the high mode of the drive range to the low mode of the drive range and to the reverse range is inhibited.

First of all, in any one of the modes and the ranges (1) to (4) described above, a hydraulic pressure from the oil pump 17 is appropriately regulated by the primary regulator valve 56 and output from an output port (v) thereof as shown in FIG. 7. At the same time, the regulated hydraulic pressure is also supplied to the first hydraulic chambers 45 and 46 of the hydraulic servos 32 and 33 respectively. Control is executed so as to produce that hydraulic pressures in both the first hydraulic chambers 45 and 46 equal to each other. The regulated hydraulic pressure is also supplied to the clutch modulation valve 62. Then, a hydraulic pressure output by the clutch modulation valve 62 is selectively supplied to the low clutch $C_L$ or the high clutch $C_H$ except during the N and P ranges (4). Operations in the modes and ranges (1) to (4) are described one mode/range after another by referring to FIGS. 4 and 7 as well as a narrowing force balance table shown in FIG. 9.

(1) L mode in drive (D) range

Equal hydraulic pressures are supplied to the first hydraulic chambers 45 and 46 respectively. The low clutch $C_L$ is engaged and, in an up shift, a hydraulic pressure is further supplied to the second hydraulic chamber 49. In addition, in a down shift, a hydraulic pressure is supplied to the second hydraulic chamber 47 but, in the region below the second pulley ratio B, the supply of the hydraulic pressure is halted, inhibiting the down shift.

That is to say, in the up shift, the manual valve 59 is operated at a D range position, opening hydraulic paths between a port (a) and a port (b), a port (c) and a port (d) as well as a port (e) and a port (f) thereof. In addition, the low-high control valve 60 is set at an L mode position, opening hydraulic paths between a port (h) and a port (i), a port (j) as well as a port (k) and a port (l) and a port (m) thereof. At the same, a switching operation is carried out to open a hydraulic path between a port (g) and a drain port Ex of the low-high control valve 60 and sustain the hydraulic path in this state.

As a result, the hydraulic pressure from the clutch modulation valve 62 is supplied to the low clutch $C_L$ by way of the ports (a) and (b) of the manual valve 59, the ports (h) and (i) of the low-high control valve 60 and ports (n) and (o) of the low clutch relief valve 61, putting the low clutch $C_L$ in an engaged state. In addition, the hydraulic pressure from the output port (v) of the primary regulator valve 56 is gradually increased by the ratio control valve 57 to a value corresponding to a target pulley ratio. The gradually increasing hydraulic pressure is then supplied to the second hydraulic chamber 49 through ports (p) and (q) of the ratio control valve 57, the ports (c) and (d) of the manual valve 59 and the ports (j) and (k) of the low-high control valve 60. It should be noted that, in this state, a hydraulic path between the port (g) of the low-high control valve 60 and the drain port Ex is opened as described above, hence putting the hydraulic chamber of the high clutch $C_H$ in a released state. In addition, the second hydraulic chamber 47 of the primary-side hydraulic servo 32 has a hydraulic path opened to a drain port Ex of the down-shift relief valve 58 by way of ports (m) and (l) of the low-high control valve 60, the ports (f) and (e) of the manual valve 59 and a port (s) of the down-shift relief valve 58.

As a result, the low clutch $C_L$ is engaged and, at the same time, in the CVT 11, an axial force generated by the secondary-side hydraulic servo 33 in which hydraulic pressures are applied to both the first and second hydraulic chambers 46 and 49 exceeds an axial force generated by the primary-side hydraulic servo 32 in which a hydraulic pressure is applied only to the first hydraulic chamber 45. The axial force generated by the secondary-side hydraulic servo 33 is further increased gradually to raise the pulley ratio. At that time, the movable sheave 7b of the primary pulley 7 is moved to the U/D side. In this state, an engine torque transmitted from the first shaft 3 to the carrier 19c of the planetary gear 19 by way of the low clutch $C_l$ and the power transmitting apparatus 26 is output to the second shaft 5 by way of the ring gear 19r while the engine torque is being controlled in the CVT 11 by a predetermined pulley ratio through the sun gear 19s.

When an up shift is continued, the pulley ratio is gradually increased. Before the pulley ratio reaches the second pulley ratio B shown in FIG. 4, however, the operation of the low-high control valve 60 driven by the on/off operations of the solenoid valve which is not shown in the figure is inhibited. That is to say, in an up shift, the movable sheave 7b of the primary pulley 7 is moved to the U/D (underdrive) side and the sensor shoe 65 associated with the movable sheave 7b is moved in the downward direction in the figure. Before the pulley ratio reaches the second pulley ratio B, however, the base end 66a of the interlock rod 66 is brought into contact with the surface of the sensor shoe 65 without being engaged with the detent 65a. As a result, the other end 66b of the interlock rod 66 on the opposite side to the base end 66a is engaged with the detent 60a of the low-high control valve 60, mechanically locking the low-high control valve 60 in a state sustaining the low mode. In this state, operations are inhibited.

As the up shift brings the pulley ratio to the second pulley ratio B, the base end 66a of the interlock rod 66 is engaged with the detent 65a of the sensor shoe 65. The other end 66b on the opposite side is moved to the right in the figure, freeing the engagement thereof with the detent 60a of the interlock rod 66. As a result, at a pulley ratio above the second pulley ratio B, the operation of the low-high control valve 60 is enabled. It should be noted that, also in the high mode of the drive range, at a pulley ratio below the second pulley ratio B, the low-high control valve 60 is locked mechanically as will be described later.

A down shift of the CVT ratio in the low mode of the drive range in the region below the second pulley ratio B is inhibited but enabled in the region above the second pulley ratio B. To put it in detail, in the former region, the ratio sensing valve 63 which moves in an associated manner with the movable sheave 7b of the primary pulley 7 by way of the sensor shoe 65 is in a state shown in the figure. In this state, the hydraulic pressure from the port (v) of the primary regulator valve 56 is halted by the ratio sensing valve 63, making it impossible to supply a hydraulic pressure necessary for a down shift to the second hydraulic chamber 47. It should be noted that, also in this state, a hydraulic path between a port q of the ratio control valve 57 and the drain port Ex thereof is opened, allowing the hydraulic pressure of the second hydraulic chamber 49 to be drained to the port Ex by way of the ports (k) and (j) of the low-high control valve 60, the ports (d) and (c) of the manual valve 59 and the port (q) of the ratio control valve 57. As a result, a down shift till Pri=Sec shown in FIG. 9 is possible.

In the region above the second pulley ratio B, on the other hand, a down shift is possible by virtue of, among other components, the ratio sensing valve 63. That is to say, in the region above the second pulley ratio B, the movable pulley 7b of the primary pulley 7 is moved to the U/D side, driving the ratio sensing valve 63 in the downward direction of the figure by way of the sensor shoe 65. As a result, since the hydraulic path between ports (t) and (u) of the ratio sensing valve 63 is opened, the hydraulic pressure from the primary regulator valve 56 is led to the down-shift relief valve 58 by way of a check valve 69. The hydraulic pressure moves the down-shift relief valve 58 in the upward direction of the figure, opening a hydraulic path between the port (r) and the port (s) thereof. In this state, it becomes possible to supply a hydraulic pressure to the second hydraulic chamber 47 by way of the ports (e) and (f) of the manual valve 59 and the ports (l) and (m) of the low-high control valve 60. In other words, a down shift can be carried out.

It should be noted that, by properly setting the second pulley ratio B, in a region where a down shift is required, it is possible to make a down shift works effectively. For example, if the second pulley ratio B is set at a location in close proximity to the first pulley ratio A which corresponds to the neutral state, with a change gear ratio of the continuously variable transmission as a whole set at about the same value as the first gear ratio (the first speed) of the ordinary automatic transmission (A/T), the pulley ratio is fixed at the second pulley ratio B, allowing an effective engine brake to function.

(2) H mode of drive range

Equal hydraulic pressures are supplied to the first hydraulic chambers 45 and 46 respectively. The high clutch $C_H$ is engaged and, in an up shift, a hydraulic pressure is further supplied to the second hydraulic chamber 49. In addition, in a down shift, a hydraulic pressure is supplied to the second hydraulic chamber 47. In the region below the second pulley ratio B, the operation of the low-high control valve 60 is mechanically inhibited.

That is to say, in the high mode of the drive range, the manual valve 59 is placed at the D range position as shown in FIG. 7 as is the case with the low mode explained previously. However, the low-high control valve 60 is switched to the H mode position, opening hydraulic paths between the ports (h) and (g), the ports (j) and (m) and the ports (l) and (k) as well as a hydraulic path between the port (i) and the drain port Ex.

In this state, the hydraulic pressure from the output port (v) of the primary regulator valve 56 is supplied to the hydraulic servo of the high clutch $C_H$ by way of the ports (a) and (b) of the manual valve 59 and the ports (h) and (g) of the low-high control valve 60, putting the high clutch $C_H$ in an engaged state. In addition, the hydraulic pressure from the output port (v) of the primary regulator valve 56 is also supplied to the second hydraulic chamber 47 of the primary-side hydraulic servo 32 by way of the ports (p) and (q) of the ratio control valve 57, the ports (c) and (d) of the manual valve 59 and the ports (j) and (m) of the low-high control valve 60. It should be noted that, in this state, a hydraulic path between the port (i) of the low-high control valve 60 and the drain port Ex thereof is opened, hence putting the hydraulic chamber for and the low clutch $C_L$ in a released state. In addition, the second hydraulic chamber 49 of the secondary-side hydraulic servo 33 has a hydraulic path opened to a drain port Ex of the down-shift relief valve 58 by way of ports (k) and (l) of the low-high control valve 60, the ports (f) and (e) of the manual valve 59 and a port (s) of the down-shift relief valve 58.

As a result, the high clutch $C_H$ is engaged and, at the same time, in the CVT 11, an axial force generated by the primary-side hydraulic servo 32 in which hydraulic pressures are applied to both the first and second hydraulic chambers 45 and 47 exceeds an axial force generated by the secondary-side hydraulic servo 33 in which a hydraulic pressure is applied only to the first hydraulic chamber 46, putting the CVT 11 in an axial force state for torque transmission from the primary pulley 7 to the secondary pulley 9. In this state, by properly regulating the ratio control valve 57, the hydraulic pressure in the second hydraulic chamber 47 of the primary-side hydraulic servo 32 can be regulated. As a result, the axial force produced by the primary-side hydraulic servo 32 is also regulated to give an appropriate pulley ratio (that is, an appropriate torque ratio). In this state, a torque transmitted from the engine to the first shaft 3 is properly changed by the CVT 11 in which transmission from the primary pulley 7 to the secondary pulley 9 is under way and further output to the second shaft 5 by way of the high clutch $C_H$.

In the high mode of the drive range described above, as the pulley ratio goes below the second pulley ratio B, the operation of the low-high control valve 60 is mechanically inhibited. This is because, at a pulley ratio equal to or greater than the second pulley ratio B, the movable sheave 7b of the primary pulley 7 is placed on the U/D side shown in the figure and the base end 66a of the interlock rod 66 is engaged with the detent 65a of the sensor shoe 65 while, on the other hand, the other end 66b thereof on the opposite side is out of the detent 60b of the low-high control valve 60 and moves to the right in the figure, enabling the operation of the low-high control valve 60. At a pulley ratio equal to or smaller than the second pulley ratio B, on the contrary, the movable sheave 7b of the primary pulley 7 is placed on the O/D side shown in the figure and the base end 66a of the interlock rod 66 is brought into contact with the surface of the sensor shoe 65 while, on the other hand, the other end 66b thereof on the opposite side is engaged with the detent 60b of the low-high control valve 60. As a result, the low-high control valve 60 is mechanically locked in a state in which the high mode is sustained, inhibiting the operation thereof.

That is to say, at a pulley ratio equal to or smaller than the second pulley ratio B, the operation of the low-high control valve 60 is mechanically inhibited, be it in the low mode of the drive range or the high mode of the drive range, sustaining the low or high mode as it is. As a result, at a high rotational speed of the second shaft 5, even if a signal is by any chance output to the solenoid valve to carry out a switching operation from the high mode of the drive range to the low mode of the drive range in the event of an electrical failure, the low-high control valve 60 will not operate, which effectively prevents over revolution of the engine and a backward drive.

In addition, in the high mode of the drive range, even at a pulley ratio equal to or smaller than the second pulley ratio B, a down shift is never inhibited unlike the low mode of the drive range. That is to say, in the high mode of the drive range, in the region below the second pulley ratio B, the hydraulic pressure from the output port (v) of the primary regulator valve 56 is halted by the ratio sensing valve 63 which is put in a state shown in FIG. 7. Thus, the hydraulic pressure is never supplied to the second hydraulic chamber 49 by way of the down-shift relief valve 58, the manual valve 59 and the low-high control valve 60. In place of the hydraulic pressure from the output port (v) of the primary regulator valve 56, however, a hydraulic pressure from the high clutch $C_H$ is supplied to the second hydraulic chamber 49 by way of the check valve 69, the ports (r) and (s) of the down-shift relief valve 58, the ports (e) and (f) of the manual valve 59 and the ports (l) and (k) of the low-high control valve 60. As a result, in the high mode of the drive range, a down shift is possible over the entire range of the pulley ratio.

(3) Reverse (R) range

In the reverse range, a predetermined hydraulic pressure is supplied to the first and second hydraulic chambers 45 and 47 of the primary-side hydraulic servo 32, the first hydraulic chamber 46 of the secondary-side hydraulic servo 33 and the hydraulic servo of the low clutch $C_L$ as shown in FIG. 7. That is to say, in the reverse range, the manual valve 59 is placed at an R range position and the low-high control valve 60 is at an L mode position as shown in the figure. In this state, hydraulic paths between the ports (a) and (b), the ports (c) and (f) as well as the ports (e) and (d) of the manual valve 59 are opened. In addition, much like the low mode described earlier, hydraulic paths between the ports (h) and (i), the ports (j) and (k), the ports (l) and (m) as well as the port (g) and the drain port Ex of the low-high control valve 60 are opened.

As a result, the hydraulic pressure from the output port (v) of the primary regulator valve 56 is supplied to the hydraulic servo of the low clutch $C_L$ by way of the ports (a) and (b) of the manual valve 59 and the ports (h) and (i) of the low-high control valve 60. The hydraulic pressure from the output port (v) of the primary regulator valve 56 is also supplied to the second hydraulic chamber 47 of the primary-side hydraulic servo 32 by way of the ports (p) and (q) of the ratio control valve 57, the ports (c) and (f) of the manual valve 59 and the ports (l) and (m) of the low-high control valve 60. In addition, a hydraulic path between the port (s) and the drain port Ex of the down-shift relief valve 58 is opened.

As a result, the low clutch $C_L$ is engaged and, at the same time, in the CVT 11, an axial force generated by the primary-side hydraulic servo 32 in which hydraulic pressures are applied to both the first and second hydraulic chambers 45 and 47 exceeds an axial force generated by the secondary-side hydraulic servo 33 in which a hydraulic pressure is applied only to the first hydraulic chamber 46, putting the CVT 11 in an axial force state for torque transmission from the primary pulley 7 to the secondary pulley 9. In this state, by properly regulating the ratio control valve 57, the hydraulic pressure in the second hydraulic chamber 47 of the primary-side hydraulic servo 32 is regulated. As a result, the axial force produced by the primary-side hydraulic servo 32 is also regulated to give an appropriate pulley ratio. In this state, the pulley ratio of the CVT 11 has a predetermined O/D value and an engine torque from the first shaft 3 is transmitted to the carrier 19c of the planetary gear 19 by way of the low clutch $C_L$ and the power transmitting apparatus 26. At the same time, an engine torque is also transmitted to the sun gear 19s by way of the CVT 11 in which torque transmission from the primary pulley 7 to the secondary pulley 9 is under way. Both the torques are combined in the planetary gear 19 and output to the second shaft 5 as a rotation in the reverse direction by way of the ring gear 19r.

Also in the reverse range, the supply of a hydraulic pressure to the down-shift relief valve 58 is inhibited by the sensor shoe 65 and the ratio sensing valve 63 as in the case of a pulley ratio equal to or smaller than the second pulley ratio B in the low mode of the drive range. As a result, a down shift is also inhibited as well. It should be noted that, in the reverse range, basically, the engine brake is not required in particular. Thus, no problem arises whatsoever even if the down shift is inhibited.

(4) Neutral (N) and parking (P) ranges

When the manual valve 59 is placed at a P range or N range position, both the low and high clutches $C_L$ and $C_H$ are disengaged and a predetermined hydraulic pressure is supplied to the first hydraulic chambers 45 and 46 of the primary-side and secondary-side hydraulic servos 32 and 33 respectively. This is because, in these ranges, hydraulic paths between the ports (c) and (d), the ports (e) and (f) as well as the port b and the drain port Ex of the manual valve 59 are opened. In addition, the low-high control valve 60 is sustained in the low mode of the drive range described earlier. On the top of that, a hydraulic path between the port (q) and the drain port Ex of the ratio control valve 57 is opened and the ratio sensing valve 63 is held at a position shown in FIG. 7.

As a result, a hydraulic pressure from the output port (v) of the primary regulator valve 56 is supplied only to the first hydraulic chamber 45 of the primary-side hydraulic servo 32 and the first hydraulic chamber 46 of the secondary-side hydraulic servo 33 and is supplied to neither of the valves 60 and 61. Thus, equal hydraulic pressures are supplied only to the first hydraulic chambers 45 and 46 of the primary-side and secondary-side hydraulic servos 32 and 33 respectively, resulting in about equal axial forces working on both the primary and secondary pulleys 7 and 9.

It should be noted that, at the D, N and R positions and in the low and high modes, a predetermined hydraulic pressure from the primary regulator valve 56 is supplied to the first hydraulic chambers 45 and 46 of the primary-side and secondary-side hydraulic servos 32 and 33 respectively, securing a predetermined axial force corresponding to a transmitted torque so as to prevent the belt from slipping. In addition, a regulated hydraulic pressure from the ratio control valve 57 is supplied to either the second hydraulic chamber 47 of the primary-side hydraulic servo 32 or the second hydraulic chamber 49 of the secondary-side hydraulic servo 33 in order to adjust the ratio of the axial force of the primary pulley 7 to the axial force of the secondary pulley 9 in a transmission operation so as to produce a predetermined pulley ratio.

In the embodiment described above, the second pulley ratio B is used as a threshold pulley ratio for inhibiting a down shift in the low mode of the drive range as well as a threshold pulley ratio for mechanically inhibiting the operation of the low-high control valve 60 in the low and high modes of the drive range. It should be noted, however, that the threshold pulley ratios can also be set at values different from each other. For example, the threshold pulley ratio for inhibiting a down shift in the low mode of the drive range can be set at a value closer to the first pulley ratio A while the threshold pulley ratio for mechanically inhibiting the operation of the low-high control valve 60 in the low and high modes of the drive range can be set at a value farther from the first pulley ratio A. At any rate, it is desirable to set the threshold pulley ratio for inhibiting a down shift in the low mode of the drive range and the threshold pulley ratio for mechanically inhibiting the operation of the low-high control valve 60 in the low (L) and high modes of the drive range at values determined by actual running conditions of the vehicle.

According to the continuously variable transmission, when the vehicle starts to move, an up shift is carried out by sustaining the relation in magnitude between the axial forces applied to the first and second pulleys to give a high pulley ratio if the forward drive state is selected or by sustaining the relation in magnitude between the axial forces to give a low pulley ratio if the backward drive state is selected. As a result, it is possible to achieve a running state according to the will of the driver with a high degree of reliability.

In addition, according to the continuously variable transmission, the hydraulic servos of the first and second pulleys each have first and second hydraulic chambers and hydraulic pressures are supplied to both the first hydraulic chambers all the time while a hydraulic pressure is supplied selectively to only one of the second hydraulic chambers in order to reverse the relation in magnitude between the axial forces. Since the inhibition means inhibits an operation to selectively supply the hydraulic pressure to one of the second hydraulic chambers in order to reverse the relation in magnitude between the axial forces in a predetermined pulley-ratio range, the control is simple and can be carried out with a high degree of reliability.

According to the continuously variable transmission, since the hydraulic pressures supplied to the second hydraulic chambers of both the hydraulic servos are controlled by the down-shift valve serving as an axial force reversing means and the ratio control valve respectively, and the control valve serving as inhibition means is provided on the upstream side of the down-shift valve, the reversal of the relation in magnitude between the axial forces can be regulated without regard to the operation of the down-shift valve, allowing control to be carried out with an even higher degree of reliability.

According to the continuously variable transmission, when an operation to switch from a low mode to a high mode and vice versa can be carried out, both the low and high modes can be set at the same pulley ratio. With the high mode selected, the hydraulic pressure supplied to the second clutch is also supplied to the down-shift valve without passing through the control valve which serves as inhibition means. As a result, the relation in magnitude between the axial forces can be reversed in the entire pulley-ratio range, allowing the engine brake to be operated effectively.

In addition, according to the continuously variable transmission, the pulley ratio is detected by the position detecting member which is used for monitoring the position of the movable sheave of one of the first and second pulleys and the position detecting means and the inhibition means are coupled to each other. As a result, control can be carried out with a high degree of reliability even in the event of an electrical failure.

Furthermore, according to the continuously variable transmission, since the predetermined pulley-ratio range is set in the vicinity of a pulley ratio implementing the neutral state and a pulley-ratio range implementing the forward drive state as well as a pulley-ratio range implementing a backward drive state, the vehicle can be started to move from the neutral state with a high degree of reliability. In other regions, the relation in magnitude between the axial forces can be reversed, making a power-off down shift possible and allowing the engine brake to be operated effectively. In addition, in the predetermined pulley-ratio range, even though the engine brake can not be operated effectively, in the vicinity of a pulley ratio implementing the neutral state and a pulley-ratio range implementing the forward drive state, the speed of the vehicle is low. As a result, since the engine brake is not required in particular. On the top of that, in the pulley-ratio range implementing the backward drive state, a shift is not necessary from the beginning. So no problem arises whatsoever even if the relation in magnitude between the axial forces is regulated.

What is claimed is:

1. A continuously variable transmission comprising:
   an input shaft associated with an engine output shaft;
   an output shaft associated with vehicle wheels;
   a belt-type continuously variable transmission apparatus comprising a first variable width pulley associated with said input shaft, a second variable width pulley provided on the side of said output shaft, a belt extending around said first and second pulleys, and axial force applying means for applying axial forces to said first and second pulleys in order to change a pulley ratio;
   a planetary gear comprising a first rotary element associated with said input shaft, a second rotary element associated with said second pulley and a third rotary element associated with said output shaft;
   pulley-ratio detecting means for detecting the pulley ratio of said belt-type continuously variable transmission apparatus; and
   control means for controlling said axial forces applied to said first and second pulleys by said axial force applying means so that said axial forces applied to said first and second pulleys are different from each other by an amount corresponding to a target pulley ratio, wherein a direction in which torque is transmitted between said first and second pulleys via said planetary gear is changed and a forward drive state, a neutral state and a backward drive state of a vehicle can be set in accordance with a change in said pulley ratio, and
   wherein said control means comprises:
      axial force reversing means for reversing a relation in magnitude between said axial forces applied to said first and second pulleys in accordance with a change in the direction in which torque is transmitted between said first and second pulleys; and
      inhibition means for inhibiting reversal of said relation in magnitude between said axial forces applied to said first and second pulleys performed by said axial force reversing means when a pulley ratio detected by said pulley-ratio detecting means is within a predetermined pulley-ratio range including a pulley ratio for achieving said neutral state.

2. A continuously variable transmission according to claim 1,
   wherein said axial force applying means comprises a first hydraulic servo having a first hydraulic chamber and a second hydraulic chamber for applying an axial force to said first pulley and a second hydraulic servo having a first hydraulic chamber and a second hydraulic chamber for applying an axial force to said second pulley;
   said control means supplies equal hydraulic pressures to said first hydraulic chambers of said first and second hydraulic servos and selectively supplies a hydraulic pressure to either of said second hydraulic chambers of said first or second hydraulic servo by means of said axial force reversing means; and
   said control means prevents the hydraulic pressure from being supplied to either of said second hydraulic chambers by said axial force reversing means by means of said inhibition means when a pulley ratio detected by said pulley-ratio detecting means is within said predetermined pulley-ratio range.

3. A continuously variable transmission according to claim 2
   wherein said axial force reversing means comprises a ratio control valve for controlling one of hydraulic pressures supplied to said second hydraulic chambers of said first and second hydraulic servos and a down-shift valve for controlling the other of said hydraulic pressures supplied to said second hydraulic chambers of said first and second hydraulic servos; and
   said inhibition means has a control valve, which is provided on the upstream side of said down-shift valve, to prevent a hydraulic pressure from being supplied to said down-shift valve.

4. A continuously variable transmission according to claim 3 further comprising:
   a first clutch for selectively engaging said input shaft with said first rotary element;

a second clutch for selectively engaging any two of said three rotary elements of said planetary gear with each other;

mode switching means for switching operation between a low mode in which a large torque is generated by engaging said first clutch and disengaging said second clutch and a high mode in which a small torque is generated by engaging said second clutch and disengaging said first clutch; and an auxiliary hydraulic path for supplying a hydraulic pressure of said second clutch to said down-shift valve without using said control valve when said high mode is selected by said mode switching means.

5. A continuously variable transmission according to claim 2 wherein said first pulley has a first movable sheave driven with a hydraulic pressure supplied to said first hydraulic servo;

said second pulley has a second movable sheave driven with a hydraulic pressure supplied to said second hydraulic servo;

said pulley-ratio detecting means has a position detecting member which accompanies one of said first and second movable sheaves to detect the position of said one of said first and second movable sheaves; and said inhibition means is coupled to said position detecting member.

6. A continuously variable transmission according to claim 1 wherein said predetermined pulley-ratio range is set in the vicinity of a pulley ratio for achieving said neutral state and a pulley-ratio range for achieving said forward drive state as well as a pulley-ratio range for achieving a backward drive state.

7. A continuously variable transmission according to claim 1 wherein said inhibition means inhibits reversal of said relation in magnitude between the axial forces applied to said first and second pulleys performed by said axial force reversing means to prevent a power-off down-shift when a pulley ratio detected by said pulley-ratio detecting means is within said predetermined pulley-ratio range.

8. A continuously variable transmission according to claim 1 wherein said first, second and third rotary elements of said planetary gear are a carrier, a sun gear and a ring gear respectively.

* * * * *